Feb. 11, 1958  R. B. BENNETT ET AL  2,823,241
METHOD FOR WASHING A FILTER CAKE
Filed March 22, 1954
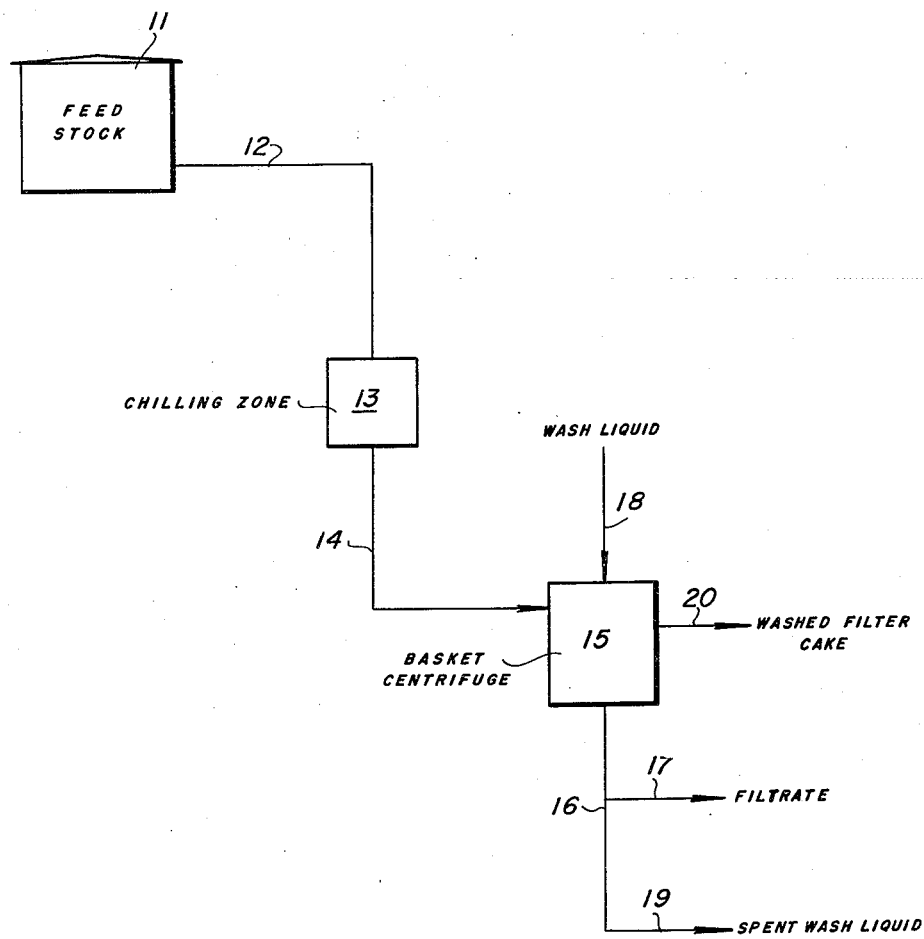
INVENTORS.
Rufus B. Bennett,
BY Raymond A. Speed,
William T. Hunt,
ATTORNEY.

United States Patent Office 2,823,241
Patented Feb. 11, 1958

2,823,241

METHOD FOR WASHING A FILTER CAKE

Rufus B. Bennett, William T. Hunt, and Raymond A. Speed, Baytown, Tex., assignors, by mesne assignments, to Esso Research and Engineering Company, Elizabeth, N. J., a corporation of Delaware Application March 22, 1954, Serial No. 417,882

3 Claims. (Cl. 260—674)

The present invention is directed to a method for washing a filter cake. A more specific aspect of the present invention is the separation of a high purity filter cake from a slurry by a single step of separating the crystals on a filter medium, such as a basket centrifuge with the washing of the filter cake with washing liquid miscible with the mother liquor and at a temperature greater than the temperature of the filter cake and a vapor pressure no less than one-fifth atmosphere at the temperature of the filter cake.

The invention will now be described in more detail in conjunction with the drawing in which the sole figure is in the form of a diagrammatic flow sheet.

Turning now specifically to the drawing, a feed stock containing a crystallizable organic compound is withdrawn from tank 11 and passed through line 12 to a chilling zone 13 where it is chilled to such a temperature as to form a slurry having at least part of the selected organic compound separated out in crystal form. The chilled slurry is then withdrawn through line 14 and passed to basket centrifuge 15 where it is separated into a filter cake fraction and a filtrate fraction. In order to simplify the drawing, the basket centrifuge 15 is shown as a rectangle with line 16 and branch line 17 for withdrawing the filtrate fraction. The filter cake on the centrifuge is then washed with a solvent introduced through line 18. The solvent used is miscible with the mother liquor of the filter cake, has a vapor pressure of no less than one-fifth of an atmosphere at the temperature of the filter cake and is introduced into the filter as a liquid at a temperature greater than the temperature of the filter cake and close to the boiling point of the solvent. The spent wash liquid is withdrawn from the centrifuge through line 16 and branch line 19. After the filter cake has been washed it is removed from the basket centrifuge through an outlet line 20. This filter cake is a high purity fraction.

By way of specific example, a hydrocarbon slurry containing paraxylene in admixture with isomeric xylenes may be chilled to a temperature in the range of —95° to —100° F. to form a slurry having a paraxylene crystal content of approximately 10 weight percent. This slurry may be sent to a basket type centrifuge where it is separated into a filter cake fraction and filtrate fraction and the filter cake then washed with chilled propane introduced into the centrifuge as a liquid at its boiling point, namely, at —45° F. Data relating to the washing of three such filter cakes are set out hereafter in Table I:

Table I

|  | A | B | C |
|---|---|---|---|
| Slurry Temp., °F | —95 | —100 | —95 |
| Holding Time, Hr | 0 | 0 | 0 |
| Chg. Time, Sec | 20 | 20 | 20 |
| Spin Before Wash, Sec | 15 | 15 | 15 |
| Wash Time, Sec | 2 | 2 | 2 |
| Spin After Wash, Sec | 43 | 23 | 43 |
| Total Spin, Sec | 60 | 40 | 60 |
| Wash used | $C_3H_8$ | $C_3H_8$ | $C_3H_8$ |
| Temp. Wash, °F | —45 | —45 | —45 |
| Vol. Wash/Vo.. Feed | .049 | .067 | .049 |
| Conc. Purity, Wt. Percent PX | 96.4 | 95.5 | 96.4 |
| Yield Cake, Wt. Percent | 10.3 | 9.9 | 10.2 |
| Yield 100% PX Based on Feed | 9.9 | 9.4 | 9.8 |

It is a particular advantage that the procedure as described results in a paraxylene cake which is fluffy, light and easily removable from the filter. This advantageous filter cake is obtained by the use of a small amount of wash propane. While specific amounts of propane used for washing the three filter cakes in Table I are given in terms of volume of wash per volume of feed, it may be stated that in general it is desirable to use within the range of .1 to .6 part by weight of liquid propane based on the filter cake for the washing step.

In addition to treating a feed stock containing paraxylene in admixture with isomeric xylenes, other feed stocks may be used. An example of another feed stock is an aromatic hydrocarbon fraction boiling between 365 and 425° F. containing 10 wt. percent durene (1,2,4,5, tetramethylbenzene) which is chilled to about —60° F. to give a slurry of about 6 wt. percent durene which slurry may then be separated into a filter cake of durene crystals. The filter cake may be washed in accordance with the present invention. As another feed a naphthenic hydrocarbon fraction containing 85 mol percent cyclohexane may be chilled to —50° F. to form a slurry of 11.8 mol percent cyclohexane crystals and the slurry centrifuged to form a filter cake which is washed. Another suitable feed stock is an aromatic fraction containing 35 mol percent benzene which may be chilled to —9° F. to produce a slurry containing 5.8 mol percent benzene crystals. Another feed stock consists of 45 wt. percent orthoxylene mixed mainly with metaxylene which upon chilling to —75° F. produces a slurry of 12.7 wt. percent solids content. Another example is a hydrocarbon solution containing 15 wt. percent naphthalene which may be chilled to —60° F. to produce a slurry of about 10 wt. percent solids content. In each of the mixtures given heretofore the resultant slurry may be sent to a basket type centrifuge where it is separated into a filter cake fraction and a filtrate fraction and the filter cake then washed with a wash liquid having a high vapor pressure, that is, no less than approximately ⅕ of an atmosphere and at a temperature greater than the temperature of the filter cake. The wash liquid used to wash the filter cake in accordance with the present invention has the characteristics of being miscible with the mother liquor of the filter cake, having a temperature greater than the temperature of the filter cake and having a high vapor pressure, that is no less than ⅕ atmosphere of vapor pressure, at the temperature it is used. For convenience, it will often be found desirable to utilize propane as the wash liquid since it is readily available and is suitable for use with a large number of hydrocarbon mixtures. However, other materials may be employed if desired. Examples are butane and mixtures of hydrocarbons such as mixtures of propane and butane and mixtures of ethane with propane or mixtures of ethane, propane and butane. In addition, mixtures of other hydrocarbons, for example, including ethylene and propylene, may be employed if desired. In any event, it will be found when using these materials as the wash liquid that it will be desirable to use from approximately .1 to .6 part by weight of the wash liquid based on the filter cake being washed and that the resultant cake obtained by this washing step is easily handled in that it is fluffy, dry and easily removable from the filter.

From the foregoing description it will be seen that we have described a process for separating a high purity fraction of a selected hydrocarbon from a feed stock containing said selected hydrocarbon. This process includes the steps of chilling the feed stock to such a temperature that at least a portion of the selected material is crystallized out to form a slurry, the slurry separated into a filter cake fraction and a filtrate fraction and the filter cake fraction then washed with a wash liquid completely miscible with the mother liquor and having a high vapor pressure, no less than approximately 1/5 atmosphere at the temperature of the filter cake, the washed filter cake having a high purity of said selected compound.

We have fully described and illustrated the practice of the present invention. What we desire to claim as our invention is:

1. A method for recovering crystals of a selected cyclic hydrocarbon including the steps of forming a slurry consisting of crystals of said selected hydrocarbon in a mother liquor at a selected temperature to establish an equilibrium between said crystals and passing said slurry to a basket centrifuge and there separating it into a filtrate fraction and a filter cake fraction consisting of crystals of said selected hydrocarbon and said mother liquor, forming a body of a wash liquid miscible with said mother liquor, said wash liquid having a boiling point above the said selected temperature and a vapor pressure of at least one-fifth atmosphere at the temperature of the said filter cake, passing 0.1 to 0.6 part by weight of said wash liquid per part of said filter cake through said filter cake in said centrifuge at the boiling point of said wash liquid to displace said mother liquor and to substantially purify said crystals of said selected hydrocarbon and recovering said purified crystals from said centrifuge in dry, fluffy form.

2. A method for purifying crystals of paraxylene including the steps of forming a filter cake consisting essentially of paraxylene crystals and mother liquor at a temperature in the range from about −70° to −100° F., passing liquefied propane at atmospheric pressure and a temperature of about −45° F. through said filter cake to purify said crystals, about 0.1 to 0.6 part by weight of propane being used for each part of filter cake, and recovering said purified crystals in dry, fluffy form.

3. A method for recovering substantially pure paraxylene crystals from a mixture of isomeric xylenes including the steps of forming a slurry consisting of paraxylene crystals and mother liquor having a temperature in the range of about −95° to −100° F., passing said slurry to a basket centrifuge and there separating it into a filtrate fraction and a filter cake fraction consisting of paraxylene crystals and mother liquor, passing about 0.1 to 0.6 part by weight of liquefied propane per part of filter cake through the said filter cake in the said centrifuge to remove mother liquor from said filter cake and to substantially purify said paraxylene crystals, said propane being passed through said filter cake while at a temperature of approximately −45° F., and recovering said purified crystals from said centrifuge in dry fluffy form.

References Cited in the file of this patent

UNITED STATES PATENTS

| 2,383,174 | Weir | Aug. 21, 1945 |
| 2,435,792 | McArdle et al. | Feb. 10, 1948 |
| 2,484,834 | Keeling | Oct. 18, 1949 |
| 2,541,682 | Arnold | Feb. 13, 1951 |

OTHER REFERENCES

Norris: Experimental Organic Chemistry (1924), second edition, pages 3–8. McGraw-Hill Pub. Co., New York.